E. A. FRANTZ.
BALE TIE BUCKLE.
APPLICATION FILED MAR. 10, 1913.
1,070,795.
Patented Aug. 19, 1913.
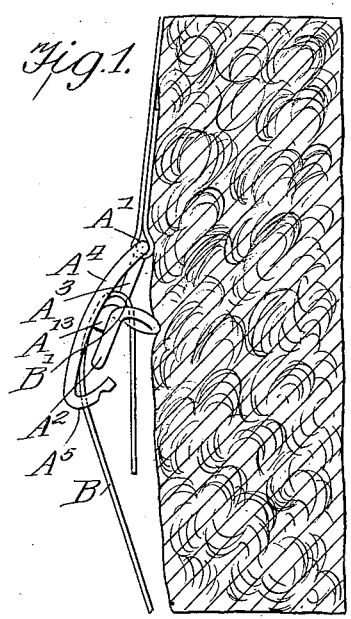
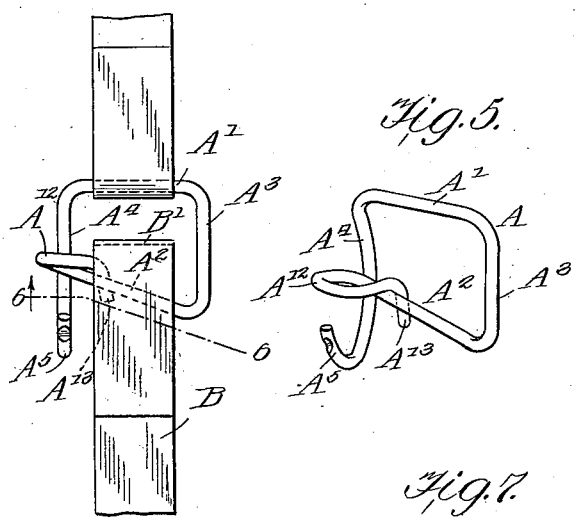
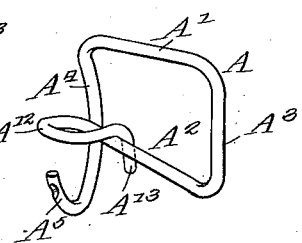
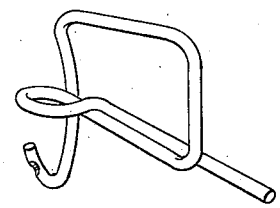
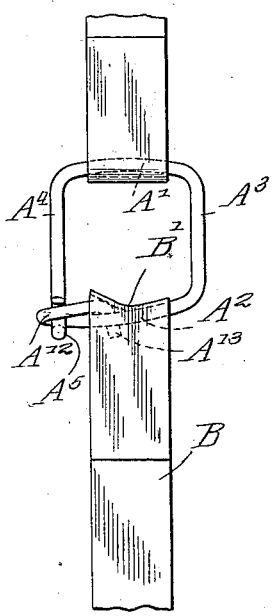
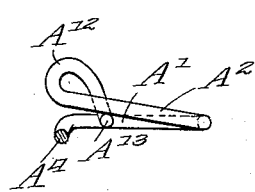
WITNESSES
INVENTOR
EZRA A. FRANTZ,
BY
ATTORNEYS

UNITED STATES PATENT OFFICE.

EZRA A. FRANTZ, OF WEATHERFORD, TEXAS, ASSIGNOR TO FRANTZ STANDARD BUCKLE COMPANY, OF WEATHERFORD, TEXAS, A CORPORATION OF TEXAS.

BALE-TIE BUCKLE.

1,070,795.

Specification of Letters Patent.

Patented Aug. 19, 1913.

Application filed March 10, 1913. Serial No. 753,181.

*To all whom it may concern:*

Be it known that I, EZRA A. FRANTZ, a citizen of the United States, and a resident of Weatherford, in the county of Parker and State of Texas, have invented certain new and useful Improvements in Bale - Tie Buckles, of which the following is a specification.

This invention is an improvement in bale tie buckles and has for an object to provide a novel construction of bale tie buckle formed of a length of wire and in which the buckle is closed by the strain or stress on the bale tie; and the invention consists in certain novel constructions and combinations of parts as will be hereinafter described and claimed.

In the drawing Figure 1 is a side view, and Fig. 2 a back view of a buckle embodying my invention with the yielding end bar in open position. Fig. 3 is a side view and Fig. 4 a back view of a buckle with the yielding end bar in closed position. Fig. 5 is a perspective view of a buckle embodying my invention with the yielding end bar in open position. Fig. 6 is a detail cross section on about line 6—6 of Fig. 2. Fig. 7 shows a somewhat different construction from that shown in Fig. 5.

In practice, the buckle A is formed from a length of wire bent into approximately quadrangular shape forming the end bars $A'$ and $A^2$ and the side bars $A^3$ and $A^4$. The end bar $A^2$ is free at one end and is yieldable so that its free end may be drawn from the position shown in Figs. 1, 2 and 5 to the position shown in Figs. 3 and 4, the side bar $A^4$ being longer than the side bar $A^3$ and having at its free end an up-turned hook $A^5$ in alinement with and in position to enter the eye $A^{12}$ when the yieldable end bar $A^2$ is pulled down from the position shown in Figs. 1 and 2 to that shown in Figs. 3 and 4 by the stress on the bale tie. In this position shown in Figs. 3 and 4, the hook entering the eye interlocks with the end bar $A^2$ in securing a strong closure of the buckle. The eye $A^{12}$ is bent from the bar $A^2$ and is extended forming an arm $A^{13}$ which is bent into engagement with the arm $A^2$ to lock the said eye to the arm and prevent any spreading of the eye under tension. It will be noticed especially from Fig. 4, that the eye on the bar $A^2$ is spaced from the hook $A^5$ at such distance that when the eye is brought by strain upon the bale tie to the position shown in Fig. 4, to receive and interlock with the hook, the yielding bale engaging bar $A^2$ will occupy a position oblique to the other bale tie engaging bar $A'$. However the parts may be so arranged that the bar $A^2$ will or will not occupy such oblique position as may be desired.

As best shown in Figs. 1, 3 and 5 the side bar $A^4$ is bent at its middle away from the free end of the end bar $A^2$ forming a space for the introduction of the loop at $B'$ on the end of the bale tie B such loop prior to the strain on the tie B being large as best shown in Fig. 1 of the drawing and requiring considerable space in fitting the same over the end bar $A^2$. When the arm $A^2$ is pulled down to the position shown in Fig. 4, the notch in the outer face of the hook near the point thereof, will engage with the side bar of the eye $A^{12}$ and lock the parts positively in position. When the strain comes on the band, the upper and lower bars of the buckle will arch slightly from the strain, see Fig. 4, so that the edges of the band will be stretched, thus avoiding any slipping or creeping of the band. It will be understood that Figs. 2, 4 and 5 are from the inner side of the buckle. Instead of bending the arm $A^{13}$ down as shown in Fig. 5, this arm may be extended laterally as shown in Fig. 7 to serve as a handle in manipulating the buckle as well as for preventing the buckle from pulling back through the channels of the press block in the use of the invention.

I claim:—

1. A bale buckle consisting of a piece of wire bent into approximately quadrangular shape forming two end bars and two side bars, both side bars being fixed with relation to one of the end bars and the other end bar having a free end and bent thereat forming an eye having a locking arm bent into engagement with said end bar to prevent spreading of said eye, and the side bar corresponding with the said free end having an upturned hook projecting toward said eye and in alinement therewith, the eye in the open position of the buckle being spaced from said hook to permit the application of a bale band to said end bar, and the eye being arranged and adapted to be drawn into locking engagement with the said hook when the said end bar is drawn by stress on the bale buckle into position to close the buckle, substantially as set forth.

2. A bale buckle having a side bar provided with an upturned hook at its free end, and an end bar provided at its free end with an eye in alinement with and spaced in the open position of the buckle away from said hook and adapted to be drawn into engagement with the hook when the said end bar is adjusted into position to close the buckle, substantially as set forth.

3. A buckle having a hook and a bar provided with an eye to receive said hook, the said eye having an arm interlocking with the bar whereby to prevent the spreading of the eye, substantially as set forth.

4. A bale buckle consisting of a piece of wire bent to approximately quadrangular shape forming two bale tie engaging bars, one of which is yieldable, and two side bars one of which is of greater length than the other and terminates in an upturned hook, the yielding bale tie engaging bar being projected at its free end across the hook and provided at said end with an eye normally spaced from the hook at such distance that when the eye is brought by strain upon the bale tie to position to receive and interlock with the hook the yielding bale engaging bar will occupy a position oblique to the other bale tie engaging bar.

EZRA A. FRANTZ.

Witnesses:
J. P. OWEN,
J. C. ALSUP.

---

Copies of this patent may be obtained for five cents each, by addressing the "Commissioner of Patents, Washington, D. C."